Aug. 6, 1929.  G. A. DE VLIEG  1,723,017
ROTARY CUTTER
Filed Nov. 26, 1924
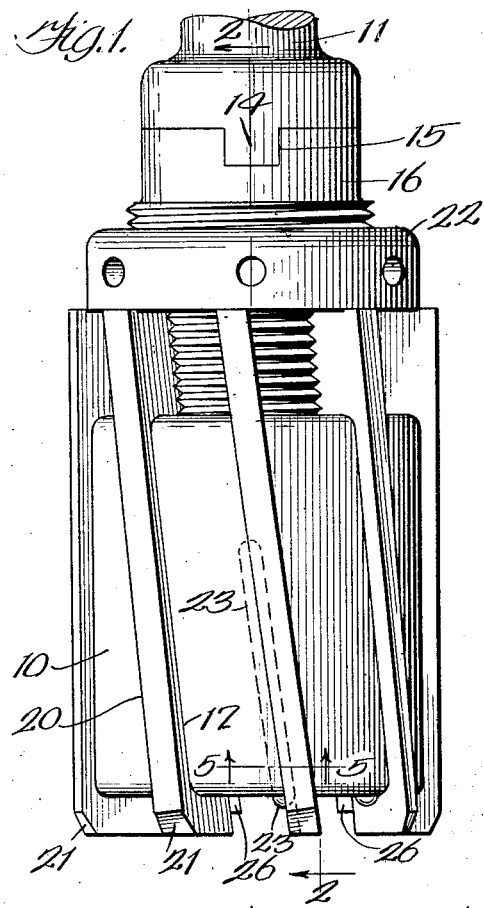
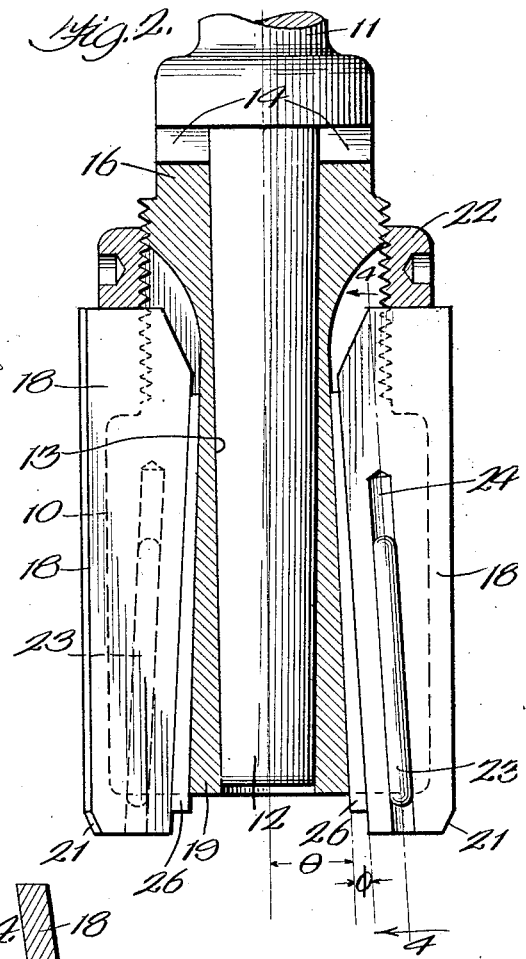
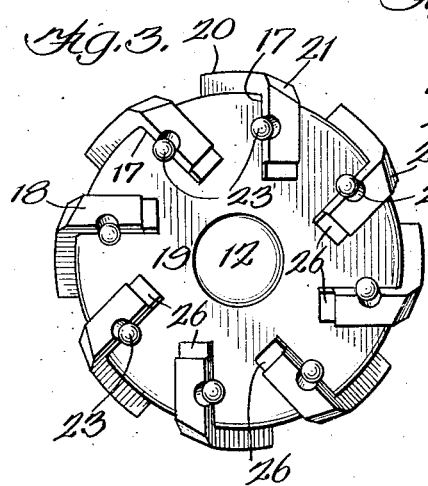
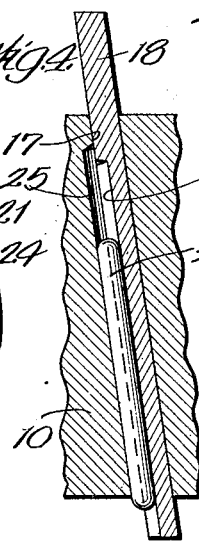
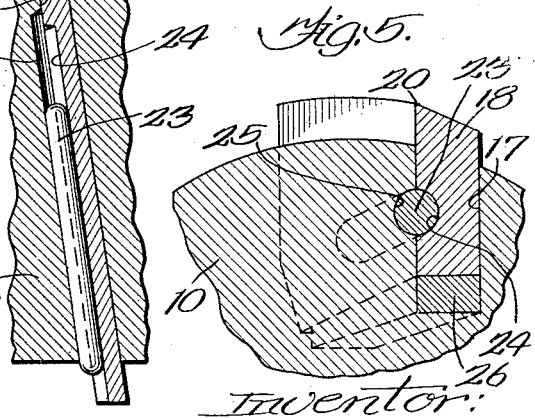
Inventor:
Gerard A. De Vlieg Patented Aug. 6, 1929.

1,723,017

UNITED STATES PATENT OFFICE.

GERARD A. DE VLIEG, OF ROCKFORD, ILLINOIS.

ROTARY CUTTER.

Application filed November 26, 1924. Serial No. 752,322.

The invention relates to improvements in rotary cutters, such as reamers, having adjustable cutting tools, and has for its primary object the provision of new and improved means for adjusting the cutting tools and securing them in assembly to the holder.

Another object is to provide a rotary cutter having a plurality of cutting tools with novel means for adjusting said tools to project equally from the body or holder.

A further object is to provide each cutting tool of the rotary cutter with improved fastening means which acts against the inner edge and front face of the tool to lock the latter solidly against the surfaces that take the thrust in the cutting operation, thereby confining the tool against inward and rearward movement.

Another object is to provide a reamer with adjustable cutting tools in which the parts of the tool locking means disposed between the tools occupy very little space, thereby permitting the provision of a maximum number of tools closely spaced together.

A general object is to provide a rotary cutter of the above character which by virtue of a simple and efficient locking means for the cutting tools is inexpensive to manufacture, and long lived in use.

Other objects and advantages will become apparent as the description proceeds.

In the accompanying drawings, Figure 1 is a side elevation of a reamer embodying the features of my invention.

Fig. 2 is a sectional view taken along line 2—2 of Fig. 1.

Fig. 3 is an end view of the reamer.

Fig. 4 is a fragmentary sectional view taken in the plane of line 4—4 of Fig. 2.

Fig. 5 is a fragmentary sectional view taken in the plane of line 5—5 of Fig. 1.

While the invention is susceptible of various modifications, alternative constructions, and adaptations, I have shown in the drawings and will herein describe in detail the preferred embodiment thereof, but it is to be understood that I do not thereby intend to limit the invention to the particular form disclosed, but aim to cover all modifications, alternative constructions and adaptations falling within the spirit and scope of the appended claims.

Referring to the exemplary embodiment of the invention, 10 represents the body or holder of the cutter, and 11 designates a shaft capable of being rotated and having a mandrel 12 which fits tightly into a tapered bore 13 extending centrally through the body. A key 14 integral with the mandrel 12 engages a key-way 15 formed in a reduced extension 16 of the body 10 to positively hold the latter against rotation on the mandrel.

Formed in the peripheral surface of the body 10 and extending in a generally longitudinal direction are a plurality of slots or recesses 17 in which a series of cutting elements, tools or blades 18 are adjustably mounted. The slots 17 preferably are equally spaced, and are slightly inclined with respect to the longitudinal axis of the cutter. Their bottom, root or inner surfaces are inclined inwardly and upwardly toward the axis of the cutter at a suitable angle $\theta$, and constitute wedge surfaces which define a flared central core 19.

The blades 18 are formed with cutting edges 20 curved to lie in a cylindrical surface corresponding to that of the bore to be reamed, and are beveled at their lower ends to provide suitable leads 21 for facilitating entry of the tool into the work. Each blade 18 has a close sliding fit with one of the slots 17, and is adapted to abut at its upper end against an adjusting ring or nut 22 mounted on a threaded portion of the extension 16.

Means is provided for locking each of the blades 18 in adjusted position. This means comprises a pin 23 which is adapted to fit into a semicylindrical groove 24 formed in the front face of the blade and into a complementary groove 25 formed in the adjacent side of the slot 17. These grooves extend longitudinally of the blade and are parallel to its inner edge which is inclined with respect to the inner surface of the slot 17 at a suitable angle $\emptyset$. A wedge member 26 having a taper equal to the angle $\emptyset$ is forced into the slot 17 in engagement with the inner surface of the blade 18, and is adapted to force the latter outwardly into shearing or locking engagement with the pin 23. The pin 23 thus serves as means for holding the blade in spaced relation to the inner surface of the slot 17, and the wedge member 26 is inserted into the space so defined to clamp the blade into position. The pin 23 and grooves 24 and 25 are of substantial length, and the wedge member 26 is substantially coextensive in length with the blade, thereby clamping the blade uniformly all along its length and over a large surface.

To adjust the blades 18, they are forced upwardly along the slots 17 and away from the nut 22 by any suitable means, thereby loosening the wedge members 26 and the pin 23. The nut 22 is then advanced to a desired point ahead of its initial position, the blades 18 are moved back against the nut, the pins 23 are properly positioned, and the wedge members 26 are forced between the blades and the core 19.

It will be seen that each blade is locked solidly against the upper surface of the wedge member 26 and is backed up by the rear side of the slot 17, thereby preventing the blade from moving inwardly or rearwardly upon meeting the thrust in the cutting operation. A large bearing surface between the clamping parts is provided to insure rigidity and reduce wear. Only one-half of each locking pin 23 is disposed between two successive blades, thereby permitting the blades to be positioned closely together and the use of a large number of blades. The locking means is extremely simple and inexpensive.

I claim as my invention:

1. A cutter comprising, in combination, a body having an outwardly opening slot defined by opposed side surfaces and a root surface, said root surface being disposed at an angle inwardly toward the axis of said cutter, a cutting element having a snug sliding fit in said slot, the inner surface of said element being disposed at an angle greater than the angle of said root surface inwardly toward the axis of said cutter, two opposed grooves formed respectively in one side surface of said slot and in the adjacent side of said element, said grooves extending generally longitudinally of said slot and being parallel to the inner surface of said element, a locking pin freely positioned in said grooves and extending longitudinally thereof, said pin serving to hold said element in an intermediate position in said slot, and an elongated wedge disposed in the space between said root surface and the inner surface of said element for holding said element in locking engagement with said pin.

2. A cutter comprising, in combination, a body having an outwardly opening slot defined by opposed side surfaces and a root surface, a cutting element having a snug sliding fit in said slot, the inner surface of said element being disposed at an angle to said root surface, two opposed grooves formed respectively in one side surface of said slot and in the adjacent side of said element, said grooves extending generally longitudinally of said slot and being outwardly inclined relative to the axis of said cutter, a locking pin freely positioned in said grooves and extending longitudinally thereof, said pin serving to hold said element in spaced relation to said root surface, and an elongated wedge disposed in the space between said root surface and the inner surface of said element for holding said element in locking engagement with said pin.

3. A cutter comprising, in combination, a body having an outwardly opening slot defined by opposed side surfaces and a root surface, a cutting element adjustably disposed in said slot, the inner surface of said element being disposed at an angle to said root surface, adjustable key means between said slot and said element extending generally longitudinally of said slot and being outwardly inclined to the axis of said cutter, said key means serving to hold said element when free for adjustment in spaced relation to said root surface, and a wedge member disposed in the space between said root surface and the inner surface of said element for holding said element in locking engagement with said key means.

4. A cutter comprising, in combination, a body having an outwardly opening slot, a cutting element disposed in said slot, a spline between said slot and said element, said spline being outwardly inclined to the axis of said cutter, so as to effect lateral adustment of said element upon longitudinal adjustment thereof, said spline serving to hold said element in spaced relation to the root surface of said slot, and a wedge member disposed in the space between said root surface and the inner surface of said element for locking said element in position.

5. A cutter comprising, in combination, a body having an outwardly opening slot defined by opposed side surfaces and a root surface, a cutting element disposed in said slot, means for holding said cutting element in spaced relation to said root surface, and a wedge disposed between said root surface and the inner surface of said element in the space defined therebetween to clamp said element in position.

6. A cutter comprising, in combination, a body having a generally longitudinal, outwardly opening slot defined by opposed side surfaces, and a root surface, an elongated cutting element disposed in said slot, means for adjustably holding said cutting element in said slot in spaced relation to said root surface, and an elongated wedge member disposed between said root surface and the inner surface of said element in the space defined therebetween to clamp said element in position.

7. A cutter comprising, in combination, a body having an elongated slot, said slot having opposed side surfaces and a longitudinally inclined root surface, an elongated cutting element disposed longitudinally in said slot, said element having an outer cutting edge adapted to lie in a cylindrical surface and having an inner surface disposed longitudinally at an angle to said root surface and having a snug sliding fit with said side surfaces, two elongated complementary grooves arcuate in cross-section and formed respectively in one side surface of said slot and in the adjacent surface of said element, said grooves extending parallel to the inner surface of said element, an elongated locking pin slidably disposed in said grooves and serving to hold element in spaced relation to said root surface, and an elongated wedge clamping member disposed longitudinally in said slot between said root surface and the inner surface of said element for locking said element in position.

8. A cutter comprising, in combination, a body having an elongated slot opening outwardly, an elongated cutting element adapted to be mounted in said slot and to have a close sliding fit therewith, a longitudinally inclined spline for said element when positioned in said slot, said spline being adapted to hold said element in an intermediate position in said slot, and an elongated wedge member adapted to be disposed in the bottom of said slot in clamping engagement with the inner surface of said element to lock said element in position.

9. A rotary cutter having, in combination, a body formed with a plurality of spaced slots, the inner surfaces of which are inclined inwardly with respect to the axis of the cutter, a plurality of cutting elements slidably disposed in said slots, complementary longitudinal grooves formed respectively in the front face of each element and the adjacent side of each slot parallel to the inner surfaces of their respective elements, elongated pins mounted longitudinally in said grooves whereby said elements are held in intermediate positions in said slots, and individual elongated wedge members mounted in said slots and engaging the inner surfaces of said elements to clamp said elements in locking engagement with said pins.

10. A cutter having, in combination, a body formed with a plurality of spaced slots, a plurality of cutting elements one slidably disposed in each slot, means for holding said elements adjustably in intermediate positions in said slots, and individual wedge members mounted in said slots and engaging the inner surfaces of said elements to secure said elements in position.

11. A cutter having, in combination, a body formed with a plurality of equally spaced slots, a plurality of cutting elements one slidably disposed in each slot, individual means one for adjustably holding each element in an intermediate position in its slot, means on said body for adjusting said elements simultaneously, and individual elongated wedge members mounted in said slots and engaging the inner surfaces of said elements to clamp said elements in adjusted position.

In testimony whereof, I have hereunto affixed my signature.

GERARD A. DE VLIEG.